Oct. 11, 1966  E. M. REDDING  3,277,823
LAMINATED PRINTING PLATE AND METHOD OF PRODUCING SAME
Filed Nov. 4, 1963  3 Sheets-Sheet 1
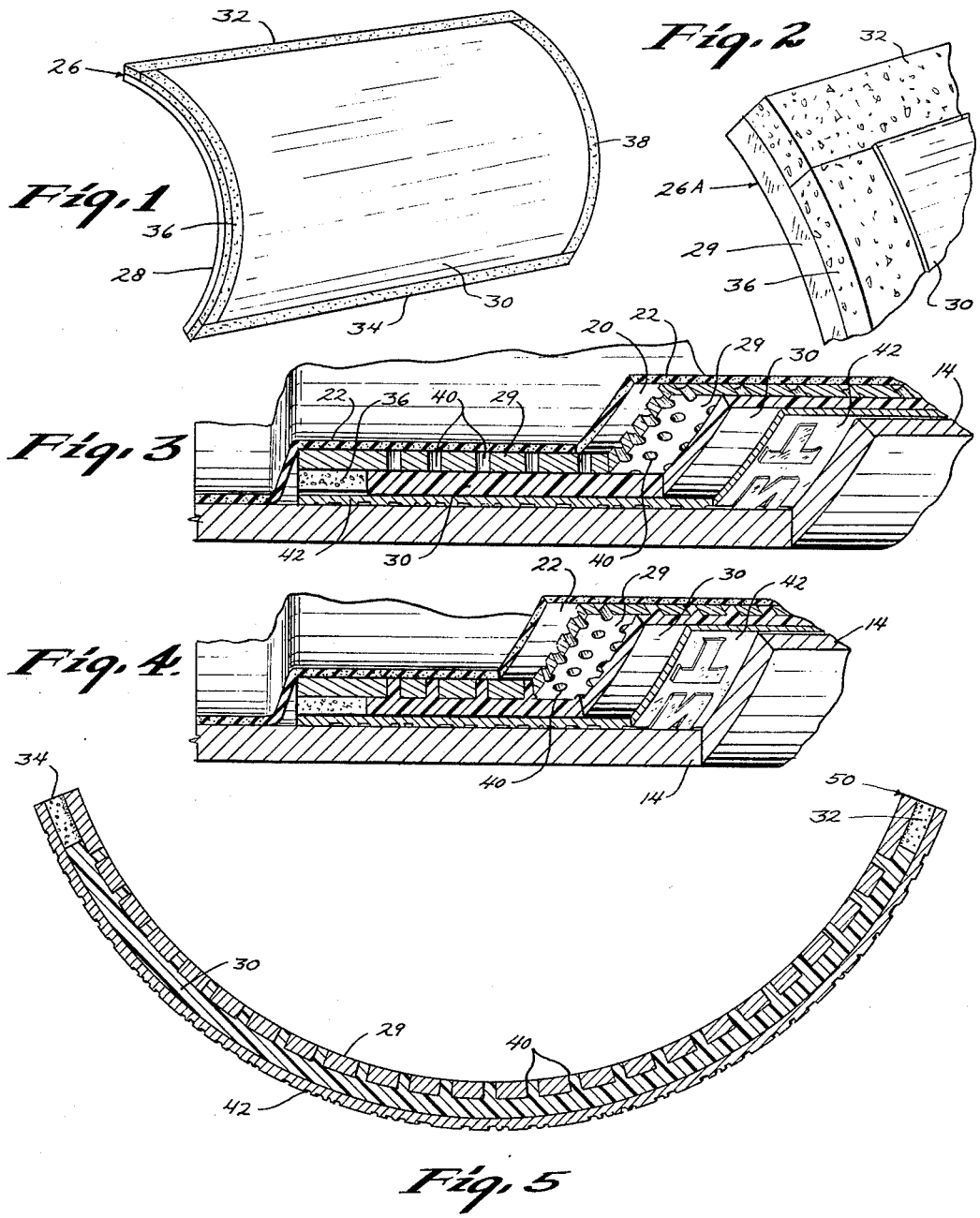
INVENTOR.
EDWARD M. REDDING
BY
Donald H. Zorley
ATTORNEY Oct. 11, 1966 E. M. REDDING 3,277,823
LAMINATED PRINTING PLATE AND METHOD OF PRODUCING SAME
Filed Nov. 4, 1963 3 Sheets-Sheet 2
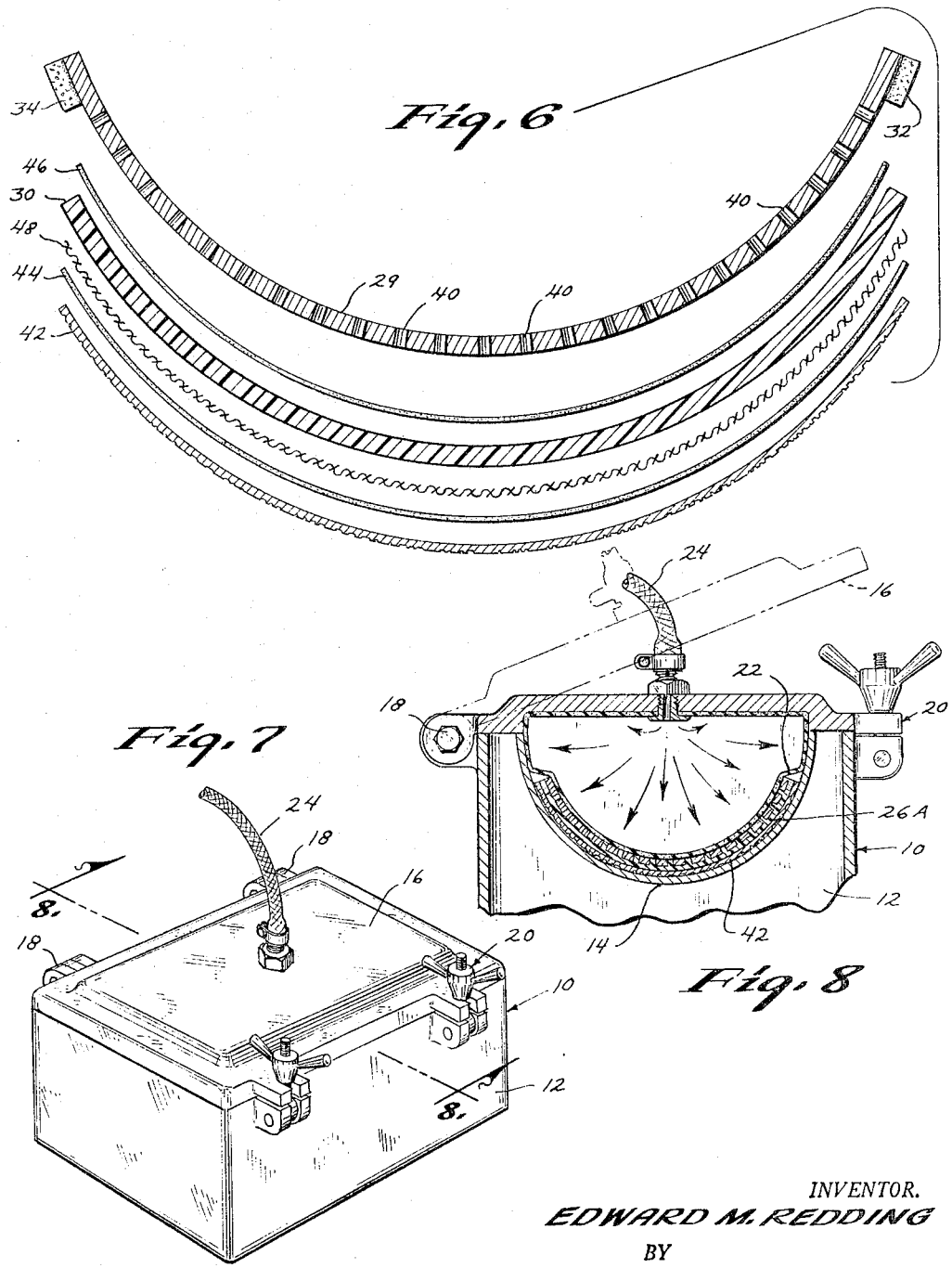
INVENTOR.
EDWARD M. REDDING
BY
Donald H. Zarley
ATTORNEY

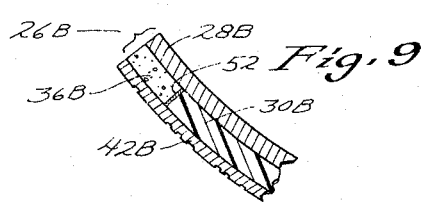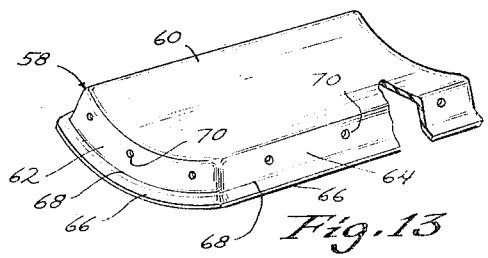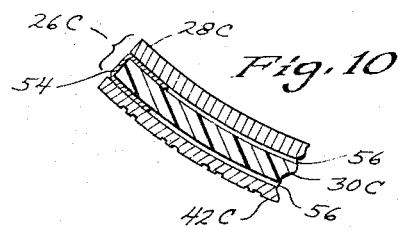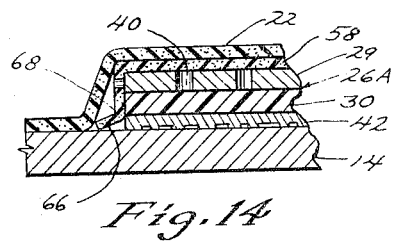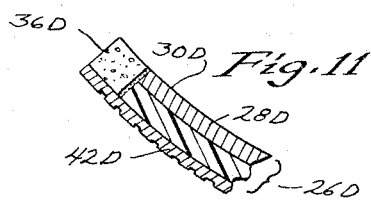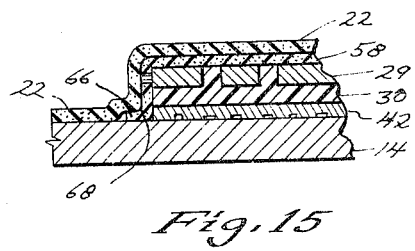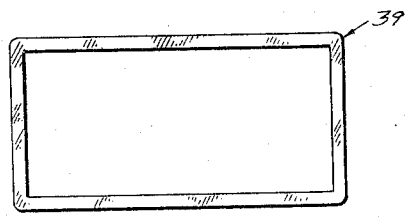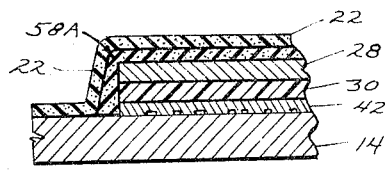
INVENTOR
EDWARD M. REDDING
BY Donald H. Zarley
ATTORNEY United States Patent Office 3,277,823
Patented Oct. 11, 1966

3,277,823
LAMINATED PRINTING PLATE AND METHOD
OF PRODUCING SAME
Edward M. Redding, Algonquin, Ill., assignor to Printing Plate Supply Co., Chicago, Ill., a corporation of Illinois
Filed Nov. 4, 1963, Ser. No. 321,151
25 Claims. (Cl. 101—401.1)

Laminated printing plates made according to the teachings of the Myers Patent No. 2,800,856 issued July 30, 1957, have made a significant impact on the graphic arts and in many areas have substantially replaced the conventional lead-backed electrotype plate. Laminated printing plates normally include the placing of a printing shell, a layer of adhesive, a layer of plastic and a metal sheet in superimposed positions. The resulting sandwich of materials is then placed in a die, and pressure and heat are applied thereto to activate the adhesive and the plastic to weld the component parts together. Pressure is normally applied to the sandwich by means of an inflatable diaphragm. As the plastic becomes fluid, and pressure is being applied, the plastic tends to flow outwardly from the sandwich for a distance of ¼ to ¾ of an inch until it finally feathers out. This deprives the base sandwich of plastic in an area between the edge of the metal sheet and a parallel line approximately ¾ of an inch removed therefrom. The diagram pressure of approximately 75 pounds per square inch on the base unit often forces the metal sheet almost downward to engagement with the printing shell. This results in a relatively thin edge on the completed plate which is often too thin to bore out, and this thin area must therefore be trimmed. This operation is time consuming and is uneconomical both from a standpoint of wasted material and expended labor.

Therefore, a principal object of this invention is to provide a laminated printing plate and method of producing same which will contain the melted plastic within the printing plate base during the laminating operation.

A further object of this invention is to provide a laminated printing plate and method of producing same wherein the laminated printing plate will be of uniform thickness across the entire plate, including corners and edges.

A still further object of this invention is to provide a laminated printing plate and method of producing same which will permit the entire area of the plastic sheet used in the plate to be usable for plate purposes.

These and other objects will be apparent to those skilled in the art.

This invention consists in the construction, arrangements, and combination, of the various parts of the device, whereby the objects contemplated are attained as hereinafter more fully set forth, specifically pointed out in the claims, and llustrated in the accompanying drawings, in which:

FIGURE 1 is a perspective view of the laminated printing plate base;

FIGURE 2 is a partial perspective view at an enlarged scale of one corner of an alternate form of laminated printing plate base;

FIGURE 3 is a perspective view of the components of a laminated printing plate as they appear in the laminating machine just prior to the beginning of the laminating operation;

FIGURE 4 is a view similar to that of FIGURE 3 but shows the various components of the laminated printing plate and the machine after the laminating operation is substantially completed;

FIGURE 5 is a sectional view through a completed laminated printing plate made according to this invention;

FIGURE 6 is a schematic view of the various components that go into one form of a laminated printing plate made according to this invention;

FIGURE 7 is a perspective view of a printing plate laminating machine;

FIGURE 8 is a sectional view of a printing plate laminating machine taken on line 8—8 of FIGURE 7;

FIGURE 9 is a partial sectional view taken through a first alternate form of laminated printing plate made according to this invention;

FIGURE 10 is a partial sectional view of the components of a second alternate form of laminated printing plate as they appear just before the lamination operation begins;

FIGURE 11 is a partial sectional view taken through a third alternate form of laminated printing plate made according to this invention;

FIGURE 12 is a plan view of an alternate form of gasket to be used in the laminated printing plate and in the process for making same as contemplated by the instant invention;

FIGURE 13 is a perspective view of a second alternate form of gasket device that is detachable from the printing plate;

FIGURE 14 is a partial sectional view taken through the assembled components of a laminated printing plate when the gasket device of FIGURE 13 is used therewith; said components being illustrated in a laminating machine just prior to the beginning of the laminating operation;

FIGURE 15 illustrates the components of FIGURE 14 after the laminating operation has begun; and FIGURE 16 is a sectional view similar to that of 14 but illustrates a modified form of the gasket device of FIGURES 13–15.

The numeral 10 generally designates a printing plate laminating machine which includes a base portion 12 having a concave-shaped arcuate die 14. A lid portion 16 is pivotally secured to the top of base portion 12 by means of hinges 18. The lid portion 16 is adapted to be fixedly closed upon the base portion 12 by means of latch assemblies 20. A flexible diaphragm 22 is secured to the inner surface of the lid portion 16 as illustrated in FIGURE 8. A conduit 24 extends through the top of the lid portion and is in communication with the interior of the diaphragm 22. Conduit 24 is adapted to be connected to a source of fluid under pressure whereby the diaphragm 22 can be selectively inflated to exert pressure downwardly on the arcuate die 14.

The numerals 26 and 26A designate alternate forms of printing plate bases. The distinctions between these two bases will be pointed out hereafter. An arcuate metal sheet 28 of aluminum or the like forms a part of base 26. Sheet 28 can be of either arcuate or flat construction. A corresponding aluminum sheet 29 appears in base 26A and the sheets 28 and 29 differ only in that sheet 29 contains a plurality of perforations as will be discussed hereafter. Each of the bases contains a plastic layer 30 of vinyl, nylon or the like which is superimposed over the outer surface of the metal sheets 28 or 29. The sheets 28 or 29 are comprised of what originally was a generally rectangular piece of material. Similarly, the plastic layer 30 is also comprised of a piece of plastic or the like which is generally rectangular in shape. However, the length and width of the plastic layer 30 is slightly less than the length and width of the metal sheet so that when the plastic is superimposed on the metal sheet, a border of exposed metal appears around the periphery of the plastic layer. Strips of gasket materials 32, 34, 36, and 38 are secured by suitable adhesives to the border area of the metal sheets around the periphery of the plastic layer. An alternate form of gasket 39 of unitary construction is shown in FIGURE 12. The gasket material shown in the drawings and found to be most suitable is comprised of cork or a combination of cork and rubber. However, gasket material made of paperboard, string, rope, wood, rubber, foam rubber, cork or metal foil has also proved to be successful. The gasket material should be placed directly against the plastic layer and preferably should extend to the peripheral edge of the metal sheet. A pressure sensitive adhesive between the gasket material and the metal sheet has proved to be most satisfactory. When the metal sheet 29 with perforations 40 is used, the gasket material should have a thickness slightly less than the thickness of the plastic layer 30. This arrangement of structure is clearly shown in FIGURES 2 and 3.

Prior to the commencement of the laminating operation, a thin arcuate shaped metal tray is placed within the arcuate die 14 but such a tray has not been shown in the patent drawings. The precise components of a laminated printing plate can be varied but all will normally incude a printing shell, a layer of plastic, and a metal sheet. Such a laminated printing plate should include a plastic layer which has certain adhesive qualities which can effect the rigid connection between the printing shell and the metal sheet upon the completion of the laminating operation. Such a laminated printing plate 50 is generally illustrated in FIGURES 3, 4 and 5.

To commence the laminating operation, a printing shell 42 is placed downwardly within the arcuate die 14 so that the printing surface will be adjacent the arcuate die. Either of the bases 26 or 26A can then be placed downwardly upon the printing shell 42 so that the plastic layer 30 of the respective bases is adjacent the exposed surface of the printing shell. FIGURES 3 and 4 illustrate the use of base 26A which utilizes the perforated metal sheet 29. Just prior to the commencement of the laminating operation, the base 26A and printing shell 42 assume the relative positions illustrated in FIGURE 3. Pressure is then exerted downwardly on the "sandwich" of materials, and heat is simultaneously applied to the die 14. The source of heat in the laminating machine 14 has not been illustrated. The base 26A can be preheated prior to its introduction into the laminating machine. As heat and pressure are applied to the components shown in FIGURE 3, the plastic layer 30 becomes fluid, and plastic is caused to move upwardly into apertures 40 of metal sheet 29. The fluid plastic also has a tendency to move outwardly but the gasket material serves as a dam between the metal sheet 29 and the printing shell 42 to prevent the outward movement of the fluid plastic. The purpose for having the gasket material in base 26A of a thickness slightly less than the thickness of plastic layer 30 is to permit the gasket material and the plastic layer to move to a common plane on the back of the printing shell 42 at the completion of the laminating operation after the original thickness of the plastic layer has been reduced because of the movement of a portion of the plastic into the perforations 40 of metal sheet 29. Since no escape of plastic occurs when the solid metal sheet 28 is used, the base 26 presents gasket material and a plastic layer 30 which are of equal thickness.

The components illustrated in FIGURE 6 show an alternate form of laminated printing plate that can also be made according to this invention. There, a sheet of adhesive 44 is superimposed on the printing shell 42 and a layer of fibrous material, such as cheesecloth or the like, is positioned between the adhesive layer 44 and the plastic layer 30. It is also sometimes desirable to position a layer of adhesive 46 between the plastic layer 30 and the metal sheet being used and this is particularly true when the solid metal sheet 28 is used.

It should be understood that each of the components of the printing plate here involved can be separately placed into the die 14 prior to the commencement of the laminating operation. However, the bases 26 and 26A can be temporarily secured together in advance of the laminating operation to expedite material handling as the components are being placed in the die. In this connection, the adhesive layer 44 and the fibrous layer 48 can also be temporarily secured to the outer arcuate surfaces of the bases 26 and 26A prior to the commencement of the laminating operation to again facilitate the handling of the components of the printing plate as they are being positioned in the arcuate die 14.

An alternate form of base 26B is shown in FIGURE 9. Base 26B utilizes a solid sheet of aluminum 28B, and a layer of plastic 30B is secured to the sheet 28B by any of the methods or means discussed above. A printing shell 42B is similarly secured to the plastic of the base through the above defined method and means. The chief difference between the base of plate 26B and base 26 is that the gasket material 36B of base 26 is secured by adhesive or the like 52 to the edge of the plastic sheet 30B rather than to the exposed surface of the metal plate, as was the case with gasket strip 36 and metal plate 28 in base 26.

FIGURE 10 illustrates an alternate form of base 26C in superimposed position on printing shell 42C. Base 26C includes the usual metal sheet 28C and plastic layer 30C. A strip of any suitable film 54 that will not normally melt with plastic layer 30C is wrapped on the edges of the plastic layer to form a U-shaped configuration. The film 54 is secured to the plastic layer by any suitable adhesive, and the plastic layer can be "tacked" by adhesive to the metal sheet 26 prior to the laminating operation to keep the elements of the base 26C in superimposed position. The film can be comprised of aluminum foil or the like, or can be comprised of a plastic substance that has a melting point much higher than that of plastic layer 30C. If the plastic layer 30C does not have high adhesive qualities, adhesive layers 44 and 46 can be used in the laminating operation to affix the plastic layer to the metal sheet 28C and the printing shell 42C. The voids 56 shown in FIGURE 5 are filled with plastic during the laminating operation.

The base 26D shown in FIGURE 11 is identical to the base 26B shown in FIGURE 9 except that the gasket material 36D has a thickness equal to the combined thicknesses of plastic layer 30D and metal sheet 28D. The gasket material 36D is secured to the outer aligned edges of the plastic and metal sheets by adhesive 52D. The printing shell 42D is secured in place by the adhesive qualities of plastic layer 30D, or in lieu thereof, the adhesive layers 44 can be used to affix the connection between the plastic and printing shell.

A flexible plastic or rubber tray 58 is shown in FIGURES 13 through 15, and this tray includes a horizontal arcuate top portiotn 60, vertical arcuate end portions 62, and substantially vertical side portions 64. The lower edges of the side and end portions terminate in and outwardly and downwardly extending flexible flange 66 which has a natural bend or break line 68 at its point of connection with the tray 58. Apertures 70 in the side and end portions permit the escape of gases during the laminating operation. The tray is placed over the components of the laminated printing plate as shown in FIGURE 14, and the diaphragm 22 comes into contact with the tray and the die 14 as indicated. As pressure and heat are applied in the manner described, the plastic layer 30 moves upwardly into the apertures 40 of perforated metal sheet 29, which slightly reduces the total thickness of the printing plate base 26A. As this takes place, the flange 66 is bent to a horizontal position against die 14 by diaphragm 22 to seal the fluid plastic 30 against any outward movement.

The tray 58A shown in FIGURE 16 is similar to the tray 58 except that the side and edge portions thereof are wedge-shaped in cross-section with a vertical inner face, and an outer face extending downwardly and outwardly from the top of the tray. Tray 58A is normally used with a base 26 where the metal sheet 28 does not have any perforations. The wedge-shaped sides and ends of tray 58A fill the natural void left by the diaphragm 22 as it extends over and thence downwardly and outwardly from the top of the printing plate components, thus enabling the diaphragm and tray 58A to effectively contain the fluid plastic.

From the foregoing, it is seen that the gasket material will serve to contain the fluid plastic during the laminating process. The constant dimensional thickness of the resulting plate will be preserved which saves both time and material as compared to previous laminating operations where the fluid plastic is permitted to escape. In addition, the utilization of the gasket material as a component part of the plate base and as a component part of the resulting plate serves as a means to contain the fluid plastic without entailing a great amount of time. It is therefore seen that this invention will accomplish at least all of its stated objectives.

Some changes may be made in the construction and arrangement of my laminated printing plate and method of producing same without departing from the real spirit and purpose of my invention, and it is my intention to cover by my claims, any modified forms of structure or use of mechanical equivalents which may be reasonably included within their scope.

I claim:

1. The method of producing a laminated printing plate, comprising:
    forming a sandwich of materials by taking a perforated metal sheet of substantially rectangular shape,
    placing a rectangular layer of plastic of a size smaller than said metal sheet adjacent one side thereof wherein an exposed border surface of said metal will appear around the periphery of said plastic layer,
    securing a gasket material of a thickness less than said plastic layer to said metal sheet on the exposed border surface thereof,
    placing a printing shell over said plastic layer opposite to said metal sheet,
    placing said sandwich of materials in a press and applying heat and pressure thereto to melt said plastic layer to permit the melted plastic layer to be reduced to the thickness of said gasket material; and to effect the connection of said plastic to said printing shell and said metal sheet,
    and the cooling of said then laminated sandwich of materials.

2. The method of producing a laminated printing plate, comprising:
    forming a sandwich of materials by taking a perforated metal sheet of substantially rectangular shape,
    placing a rectangular layer of plastic of a size smaller than said metal sheet adjacent one side thereof wherein an exposed border surface of said metal will appear around the periphery of said plastic layer,
    securing a gasket material of a thickness less than said plastic layer to said metal sheet on the exposed border surface thereof so that said gasket material will engage the outer perimeter of said plastic layer and will align itself with the outer perimeter of said metal sheet,
    placing a printing shell over said plastic layer opposite to said metal sheet,
    placing said sandwich of materials in a press and applying heat and pressure thereto to melt said plastic layer to permit the melted plastic layer to be reduced to the thickness of said gasket material; and to effect the connection of said plastic to said printing shell and said metal sheet,
    and the cooling of said then laminated sandwich of materials.

3. The method of claim 2 wherein a layer of adhesive substance is imposed between said plastic layer and said printing shell to better effect the connection therebetween.

4. The method of claim 2 wherein a layer of fibrous material is imposed between said plastic layer and said printing shell.

5. The method of producing a laminated printing plate, comprising:
    forming a sandwich of materials by taking a metal sheet of substantially rectangular shape,
    placing a rectangular layer of plastic of a size smaller than said metal sheet adjacent one side thereof wherein an exposed border surface of said metal will appear around the periphery of said plastic layer,
    securing a gasket material to said metal sheet on the exposed border surface thereof by means of an adhesive substance to prevent any lateral movement of the gasket material relative to said metal sheet,
    placing a printing shell over said plastic layer opposite to said metal sheet,
    placing said sandwich of materials in a press and applying heat and pressure thereto to melt said plastic layer and to effect the connection of said plastic to said printing shell and said metal sheet, whereupon said adhesive substance will prevent the pressure of said melted plastic from laterally moving said gasket material,
    and the cooling of said then laminated sandwich of materials.

6. The method of producing a laminated printing plate, comprising:
    forming a sandwich of materials by taking a metal sheet of substantially rectangular shape,
    placing a rectangular layer of plastic adjacent one side of said metal sheet,
    placing a gasket material around the outer edge of said layer of plastic, and securing said gasket material to said metal sheet by means of an adhesive substance to prevent any lateral movement of the gasket material relative to said metal sheet,
    placing a printing shell over said plastic layer opposite to said metal sheet,
    placing said sandwich of materials in a press and applying heat and pressure thereto to melt said plastic layer and to effect the interconnection of said metal sheet, said plastic layer, said printing shell and said gasket material into a unitary laminated printing plate, whereupon said adhesive substance will prevent the pressure of said melted plastic from laterally moving said gasket material,
    and the cooling of said then laminated sandwich of materials.

7. In a base unit for laminated printing plates,
    a perforated metal sheet of substantially rectangular shape,
    a plastic layer of a size smaller than said metal sheet being superimposed on said sheet to provide a border area of said metal sheet around the substantial perimeter of said plastic layer,
    and a gasket material secured to said metal plate on said border area around said plastic layer;
    said gasket material having a thickness less than that of said plastic layer so that when said gasket material and said plastic layer are subjected to heat and pressure, a portion of said plastic layer will enter the perforations of said metal sheet and the resulting effective thickness of said plastic layer will be reduced to that of said gasket material.

8. In a base unit for laminated printing plates,
    a metal sheet of substantially rectangular shape,
    a plastic layer of a size smaller than said metal sheet being superimposed on said sheet to provide a border area of said metal sheet around the substantial perimeter of said plastic layer,
    and a gasket material secured by an adhesive means to said metal plate on said border area around said plastic layer; said gasket material being of a material other than metal.

9. In a laminated printing plate,
a metal sheet of substantially rectangular shape,
a plastic layer of a size smaller than said metal sheet being superimposed on said sheet to provide a border area of said metal sheet around the substantial perimeter of said plastic layer,
a gasket material secured by an adhesive means to said metal plate on said border area around said plastic layer; said gasket material being of a material other than metal,
means securing said metal sheet to said plastic layer,
and a printing shell secured to the side of said plastic layer opposite to said metal sheet.

10. The laminated printing plate of claim 9 wherein said gasket material is comprised of one from a group of materials consisting of string and rope.

11. The laminated printing plate of claim 9 wherein said gasket material is comprised of paperboard.

12. The laminated printing plate of claim 9 wherein said gasket material is comprised of rubber or foam rubber.

13. The laminated printing plate of claim 9 wherein said gasket material is comprised of cork.

14. The laminated printing plate of claim 9 wherein said gasket material is comprised of metal foil.

15. In a laminated printing plate,
a metal sheet of substantially rectangular shape,
a plastic layer of a size smaller than said metal sheet being superimposed on said sheet to provide a border area of said metal sheet around the substantial perimeter of said plastic layer,
a gasket material secured by an adhesive means to said metal plate on said border area around said plastic layer; said gasket material being of a material other than metal,
means securing said metal sheet to said plastic layer,
a fibrous layer imposed between said plastic layer and said printing shell,
and a printing shell secured to the side of said plastic layer opposite to said metal sheet.

16. In a base unit for laminated printing plates,
a perforated metal sheet of substantially rectangular shape,
a plastic layer of a size smaller than said metal sheet being superimposed on said sheet and filling the perforations thereof to provide a border area of said metal sheet around the substantial perimeter of said plastic layer,
and a gasket material secured by an adhesive means to said metal plate on said border area around said plastic layer; said gasket material being of a material other than metal.

17. In a base unit for laminated printing plates,
an arcuate metal sheet of substantially rectangular shape,
a plastic layer of a size smaller than said metal sheet being superimposed on said sheet to provide a border area of said metal sheet around the substantial perimeter of said plastic layer,
and a gasket material secured by an adhesive means to said metal plate on said border area around said plastic layer; said gasket material being of a material being of a material other than metal.

18. In a base unit for laminated printing plates,
a metal sheet of substantially rectangular shape,
a plastic layer superimposed on one side of said metal sheet,
and a gasket material secured by an adhesive means to said metal sheet and abutting at least the peripheral edges of said plastic layer; said gasket material being of a material other than metal.

19. The base unit of claim 18 wherein said gasket material is secured to the peripheral edge of said plastic layer.

20. The base unit of claim 18 wherein said gasket material is a strip of film that is folded over the peripheral edge portions of said plastic layer.

21. The base unit of claim 18 wherein said gasket material abuts and is secured to the peripheral edge portions of said metal sheet and said plastic layer.

22. The base unit of claim 18 wherein said gasket material is of unitary construction.

23. In a laminated printing plate,
a metal sheet of substantially rectangular shape,
a plastic layer superimposed on and secured to one side of said metal sheet,
a gasket material secured by an adhesive means to said base unit and abutting at least the peripheral edges of said plastic layer; said gasket material being of a material other than metal,
and a printing shell secured to the side of said plastic layer opposite to said metal sheet.

24. In a base unit adapted for laminating to an irregular-surfaced printing shell,
a metal sheet of substantially rectangular shape,
a plastic layer superimposed on one side of said metal sheet,
and a gasket material secured to said base unit;
said gasket material having a thickness less than that of said plastic layer so that when said gasket material and said plastic layer are subjected to heat and pressure, a portion of said plastic layer will enter the irregularities of said printing shell, and the resulting effective thickness of said plastic layer will be reduced to that of said gasket material.

25. In a base unit adapted for laminating to an irregular-surfaced printing shell,
a metal sheet of substantially rectangular shape,
a plastic layer of a size smaller than said metal sheet being superimposed on said sheet to provide a border area of said metal sheet around the substantial perimeter of said plastic layer,
and a gasket material secured by an adhesive means to said metal plate on said border area around said plastic layer;
said gasket material being of a material other than metal;
said gasket material having a thickness less than that of said plastic layer so that when said gasket material and said plastic layer are subjected to heat and pressure, a portion of said plastic layer will enter the irregularities of said printing shell, and the resulting effective thickness of said plastic layer will be reduced to that of said gasket material.

References Cited by the Examiner

UNITED STATES PATENTS

| | | | |
|---|---|---|---|
| 2,504,080 | 4/1950 | Myers. | |
| 2,581,718 | 1/1952 | Schaffert et al. | 101—401.1 |
| 2,800,856 | 7/1957 | Myers | 101—401.1 |
| 2,814,990 | 12/1957 | Myers | 101—401.1 |
| 3,023,700 | 3/1962 | Bishop | 101—401.1 |
| 3,029,730 | 4/1962 | Parrish et al. | 101—395 X |
| 3,062,139 | 11/1962 | Myers | 101—401.1 |
| 3,228,330 | 1/1966 | Myers | 101—401.1 |

ROBERT E. PULFREY, *Primary Examiner.*

DAVID KLEIN, *Examiner.*

HERMAN J. STRNISHA, HARLEIGH EWELL,
*Assistant Examiners.*